Figure 1:
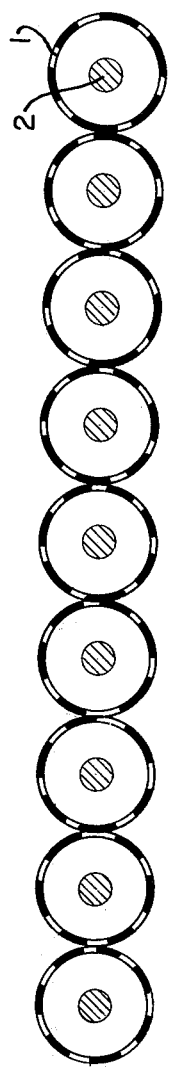

United States Patent [19]

Jeanneret

[11] 4,250,233
[45] Feb. 10, 1981

[54] TUBULAR PLATES FOR LEAD STORAGE BATTERIES

[75] Inventor: René Jeanneret, Tuileries-de-Grandson, Switzerland

[73] Assignee: Leclanché S.A., Canton of Vaud, Switzerland

[21] Appl. No.: 122,522

[22] Filed: Feb. 19, 1980

Related U.S. Application Data

[63] Continuation of Ser. No. 16,438, Mar. 1, 1979, abandoned.

[51] Int. Cl.³ .............................................. H01M 4/76
[52] U.S. Cl. ..................................... 429/140; 429/238
[58] Field of Search ......................... 429/238, 140, 141

[56] References Cited

FOREIGN PATENT DOCUMENTS 1182317 11/1964 Fed. Rep. of Germany .......... 429/238
347556 9/1955 Switzerland .............................. 429/238

*Primary Examiner*—Donald L. Walton
*Attorney, Agent, or Firm*—Lockwood, Dewey, Alex & Cummings

[57] ABSTRACT

A tubular plate comprising oval tubes aligned parallel to one another, each containing two spaced grid rods of a corrosion-resistant lead alloy as current conductors. The rods of the individual tubes are joined to form a grid having a connecting part at the top. Near the bottom, each two lead rods are connected by a crosspiece.

6 Claims, 5 Drawing Figures

TUBULAR PLATES FOR LEAD STORAGE BATTERIES

This is a continuation of application Ser. No. 016,438, filed Mar. 1, 1979 now abandoned.

This invention relates to tubular plates for lead storage batteries, of the type comprising a plurality of tubes and a plurality of grid rods connected at the top to form a grid.

Tubular plates have been used for many years now as positive electrodes in lead storage batteries of both the stationary and traction types. Such tubular plates are also known as "ironclad plates." They are described, for example, in *Bleiakkumulatoren*, by E. Witte, published by Verlag Otto Krausskopf, Mainz, Germany (3rd edition, 1969, pages 23-24), and in the *Journal of Power Sources*, Vol. 2, 1977-78, page 3.

Positive tubular plates consist of a series of plastic tubes disposed parallel to one another, customarily having a circular cross-section about 9 mm in diameter. A central, round rod of a lead alloy, about 3 mm thick, is inserted in each tube as a current conductor. These current-conductor rods are connected at the top of the tubular plate. The current-conductor rods together with the top connecting part are called as a whole a tubular-plate grid, analogously to the grids of normal pasted battery plates.

Plastic tubes for tubular plates are commercially available nowadays in the form of multitube pockets woven together. These pockets are preferably made of acid-proof, oxidation-stable plastic or glass fibers. For example, a fabric of multifilament polyester yarn, with or without interwoven glass fibers, which is stiffened with phenolic resin and has a wall thickness of 0.3-0.4 mm and pore openings of less than 0.2 mm, has proved satisfactory for this purpose.

After the tubular-plate grids have been inserted in the multitube plastic pockets, the latter are filled with lead oxide and thereafter closed at the bottom by means of a plastic strip provided with plugs which exactly fit into the tubes. The tubular plates are then anodically "formed," whereupon the lead oxide is converted into lead dioxide.

One advantage of tubular-plate batteries as compared with those having conventional pasted grid plates is their great durability, especially in cyclical operation. For example, tubular-plate batteries can withstand from 1000 to 2000 charge-and-discharge cycles of a certain type, whereas batteries having ordinary pasted plates, in comparison, can withstand only 400 to 800 cycles of the same kind. The reason is that in the case of tubular plates, the positive active material, consisting of lead dioxide particles, is firmly confined within the tubes and therefore cannot "wash out," i.e., break loose from the electrode.

As compared with normal pasted plates, tubular plates are usually considerably thicker. The customary round tubes have an inside diameter of 8 mm. Thus, the plate likewise reaches a thickness of about 9 mm. Pasted grid plates for traction batteries, on the other hand, are normally only 2-4 mm thick.

Although the greater thickness of tubular plates is also related to an extraordinarly long life the tubular plate performs somewhat less favorably than a thin, pasted grid plate at high discharge rates. At high discharge currents, the mean discharge voltage is lower and, if the discharge is terminated at a relatively high cut-off voltage, the withdrawable capacity of the tubular plates is less.

It has been attempted to construct thinner tubular plates by giving the tubes an oval shape. The cross-section of the tube is then wider in the plane of the plate than perpendicular thereto. This step makes it possible to obtain a somewhat higher discharge voltage at high currents. It has been found, however, that there is not optimum utilization of the active material in oval tubes. It appears that because of non-uniform utilization of the material during the cycle, some parts of the material become inactive. This probably has to do with a loss of electric contact between individual particles of material. The flatter the oval tubes are made, the more pronounced is this effect.

It is an object of this invention to provide a very flat tubular plate in which there is optimum and uniform utilization of the active material.

To this end, the tubular plate according to the present invention is characterized in that the tubes have a greatly flattened oval shape in cross-section and each contain at least two spaced grid rods as current conductors.

The grid rods are preferably disposed in such a way that the spacing between the longitudinal axes of each pair of rods associated with an oval tube uniformly divides the width of the tube. In another embodiment of the invention, the current conductors are connected by a thin crosspiece which facilitates the centering for insertion of the closure strips.

Figure 2:
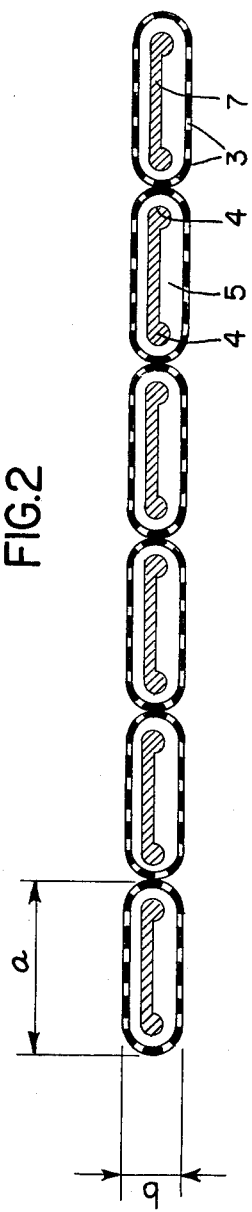
Figure 3:
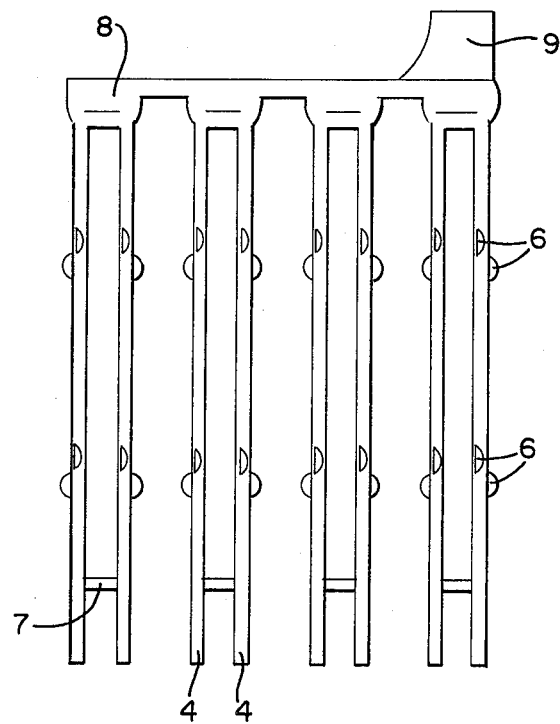
Figure 4:
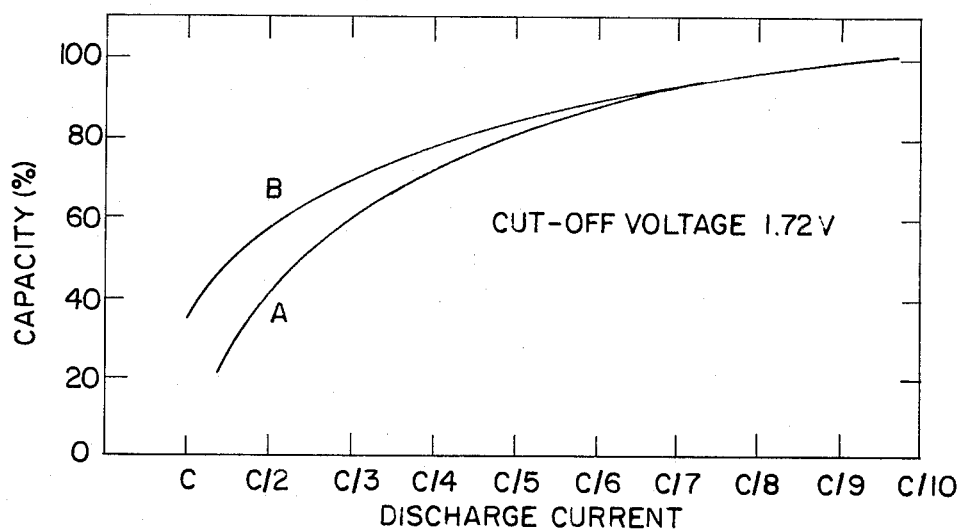
Figure 5:
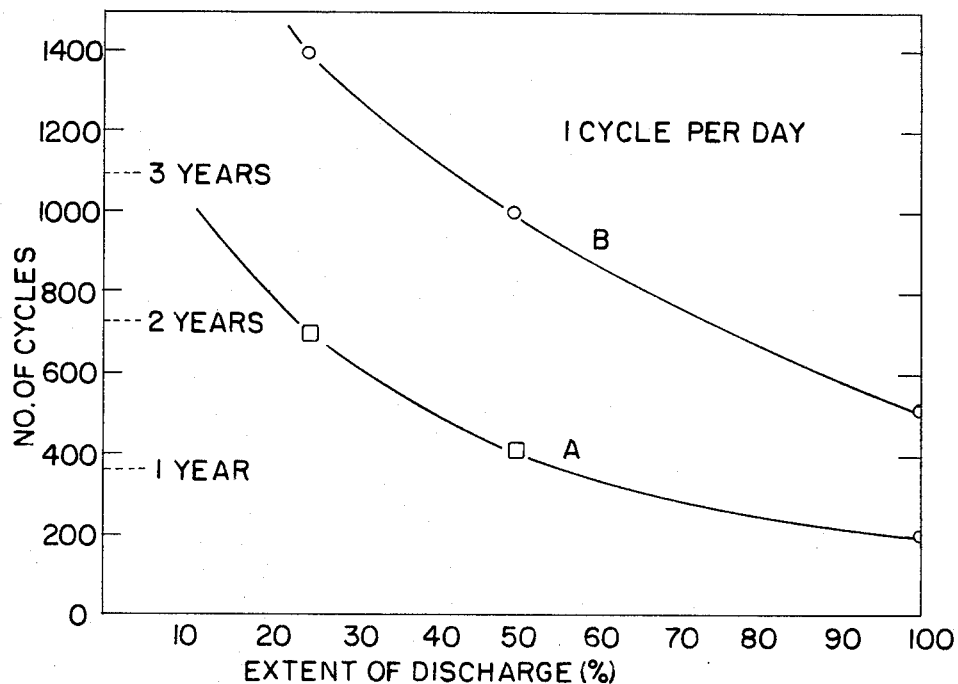

A preferred embodiment of the invention will now be described in detail, by way of example, with reference to the accompanying drawings, in which:

FIG. 1 is a cross-section through a prior art tubular plate,

FIG. 2 is a cross-section through a tubular plate according to the present invention, FIG. 3 is a plan view of a tubular plate according to this invention, FIG. 4 is a graph showing battery capacity as a function of discharge current for conventional batteries and for batteries comprising tubular plates according to this invention, and FIG. 5 is a graph showing the number of cycles attainable as a function of the extent of discharge for conventional batteries and for batteries comprising tubular plates according to the present invention.

FIG. 1 is a cross-section through a conventional tubular plate such as has been used in traction batteries for many years now. Tubes 1 have an outside diameter of about 9 mm, grid rods 2 a diameter of about 3 mm. The diameter can be optimized by having a somewhat larger cross-section at the top than at the bottom, as described in the article "Die Berechnung optimaler Bleiseelen für Panzerplatten in Bleiakkumulatoren," by R. Ludwig, in *Elektrotechnische Zeitschrift*, ETZ-A, Vol. 86 (1965), No. 13, page 431.

FIG. 2 is a cross-section, shown by way of example, through a tubular plate according to the present invention. Oval, greatly flattened tubes 3 preferably have, in cross-section, a long axis of 10-30 mm (a) and a short axis of 3-7 mm (b). Inserted in each pocket or tube 3 as current conductors are two round grid rods 4 of corrosion-resistant lead alloy, having a diameter of 1.5-2.5 mm. The rods 4 are spaced from one another at a distance corresponding to approximately half the length of the long axis (a) and are provided with the usual centering lugs 6 (not shown in FIGS. 1 and 2).

FIG. 3 is a plan view of the grid of the tubular plate according to this invention. It will be seen that the two lead rods 4 in each tube 3 are preferably connected near the bottom by a thin crosspiece 7 which increases the mechanical strength of the cast grid. The connecting crosspieces 7 facilitate the centering of the rods 4 and thereby facilitate the insertion of a bottom closure strip after the tubes 3 have been filled with lead oxide 5. The connecting crosspieces 7 are preferably 0.5–1.5 mm thick and 1.5–4.5 mm high. The grid rods 4 have a connecting part 8 at the top, joined to an appendage 9.

It has been found that no difficulties are encountered in filling the tubes 3 with lead oxide 5 despite the complex construction of the grid.

FIG. 4 illustrates one aspect of the technical advantage achieved by the design of the tubular plates according to the invention. The withdrawable capacity of tubular-plate batteries with a rating of 180 AH, expressed in percent, is shown as a function of the discharge current, indicated as a fraction of the rating C.

In the case of conventional tubular-plate batteries having plates 9 mm thick (curve A), the withdrawable capacity (cut-off voltage 1.72 V) drops relatively quickly with discharges at high currents.

Batteries with tubular plates according to the present invention, on the other hand, show significantly better high-current loading capacity (curve B). It almost reaches the values for pasted grid plates 4 mm thick, but considerably outdoes the latter with regard to service life in cyclic operation, as will be explained below.

In comparing the service life of batteries in cyclical operation, it must be borne in mind that service life depends very greatly upon the temperature, the resting time between cycles, and the extent of discharge in the individual cycles. These factors must therefore be kept constant in a valid comparative test.

In FIG. 5, the attainable number of cycles of a battery having tubular plates according to the invention is compared with that of batteries of conventional construction having pasted plates.

If the battery is discharged to a low level in every discharge-charge cycle, the service life is generally much shorter than with cycles where there is only slight discharge. Curve A in FIG. 4 relates to a battery having pasted grid plates, curve B to batteries having tubular plates according to the invention. It may be seen from this graph that, particularly for applications in which extensive discharge occurs frequently, the battery having tubular plates according to the present invention offers a far better service life. This is the case for electric traction.

What is claimed is:

1. In combination with a tubular plate for lead storage batteries of the type wherein a plurality of grid rods are connected at the top to form a grid, said grid rods are housed in tubes, said tubes have an oval shape in cross-section and each contains at least two spaced said grid rods as current conductors, each of said grid rods having a plurality of centering lugs therealong and projecting therefrom in a direction toward each said tube, the improvement which comprises at least one thin crosspiece connecting together only said at least two grid rods in each of said tubes near the bottom of said grid rods and below each said plurality of centering lugs, each said thin crosspiece being a unitary bar having a thickness substantially less than the diameter of said grid rods which it connects together, and said oval-shaped cross-section of the tubes being a greatly flattened oval shape which is substantially that of a rectangle having rounded corners.

2. A tubular plate in accordance with claim 1, wherein said at least two grid rods are spaced at a distance substantially corresponding to half the width of each of said tubes.

3. A tubular plate in accordance with claim 1, wherein each of said grid rods is from 1.5 to 2.5 mm in diameter.

4. A tubular plate in accordance with claim 1, wherein each of said tubes has in cross-section a long axis of 10–30 mm and a short axis of 4–6 mm.

5. A tubular plate in accordance with claim 1, wherein each of said crosspieces is 2–10 mm in length and 0.4–0.8 mm thick.

6. A tubular plate in accordance with claim 1, wherein each of said crosspieces is 0.5 to 1.5 mm thick and 1.5 to 4.5 mm high.

* * * * *